(12) United States Patent
Kim et al.

(10) Patent No.: US 11,359,086 B2
(45) Date of Patent: Jun. 14, 2022

(54) THERMOPLASTIC RESIN COMPOSITION

(71) Applicant: LG CHEM, LTD., Seoul (KR)

(72) Inventors: Tae Hoon Kim, Daejeon (KR); Seong Lyong Kim, Daejeon (KR); Kyung Jae Kwon, Daejeon (KR); Joon Hwi Jo, Daejeon (KR); Kyu Seong Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 153 days.

(21) Appl. No.: 16/765,777

(22) PCT Filed: Nov. 29, 2018

(86) PCT No.: PCT/KR2018/014904
§ 371 (c)(1),
(2) Date: May 20, 2020

(87) PCT Pub. No.: WO2019/112239
PCT Pub. Date: Jun. 13, 2019

(65) Prior Publication Data
US 2020/0283614 A1    Sep. 10, 2020

(30) Foreign Application Priority Data

Dec. 4, 2017    (KR) .................. 10-2017-0165310
Nov. 28, 2018   (KR) .................. 10-2018-0149687

(51) Int. Cl.
*C08L 51/00* (2006.01)
*C08L 25/12* (2006.01)
*C08L 79/08* (2006.01)

(52) U.S. Cl.
CPC ............ *C08L 51/003* (2013.01); *C08L 25/12* (2013.01); *C08L 79/08* (2013.01); *C08L 2205/025* (2013.01); *C08L 2205/035* (2013.01); *C08L 2207/04* (2013.01)

(58) Field of Classification Search
CPC .......... C08L 25/12; C08L 51/04; C08L 35/06; C08L 2205/035
See application file for complete search history.

(56) References Cited

U.S. PATENT DOCUMENTS

| | | | |
|---|---|---|---|
| 5,302,664 A | 4/1994 | Eichenauer et al. | |
| 2010/0048798 A1 | 2/2010 | You et al. | |
| 2013/0172485 A1 | 7/2013 | Jin et al. | |
| 2015/0065652 A1 | 3/2015 | Kim et al. | |
| 2016/0312026 A1 | 10/2016 | Kim et al. | |
| 2018/0265690 A1 | 9/2018 | Kim et al. | |

FOREIGN PATENT DOCUMENTS

| | | | | |
|---|---|---|---|---|
| CN | 101851378 A | 10/2010 | | |
| CN | 103396617 A | 11/2013 | | |
| JP | 2000-191867 A | 7/2000 | | |
| JP | 2004-182835 A | 7/2004 | | |
| JP | 2004182835 A | * 7/2004 | ............ | B29C 66/71 |
| JP | 2004-244518 A | 9/2004 | | |
| JP | 2004-307734 A | 11/2004 | | |
| JP | 2006-233132 A | 9/2006 | | |
| JP | 2009-155421 A | 7/2009 | | |
| KR | 10-2004-0050146 A | 6/2004 | | |
| KR | 10-2004-0110322 A | 12/2004 | | |
| KR | 10-0778012 | 11/2007 | | |
| KR | 10-2009-0072651 A | 7/2009 | | |
| KR | 10-2012-0100530 A | 9/2012 | | |
| KR | 10-2013-0075812 A | 7/2013 | | |
| KR | 10-2015-0037378 A | 4/2015 | | |
| KR | 10-2015-0066647 A | 6/2015 | | |
| KR | 10-2015-0072095 A | 6/2015 | | |
| KR | 10-2015-0144311 A | 12/2015 | | |
| KR | 10-2016-0057601 A | 5/2016 | | |
| WO | 2017-095060 A1 | 6/2017 | | |

OTHER PUBLICATIONS

Khan et al. Journal of Polymer Science: Polymer Letters Edition, vol. 18, 465-470 (Year: 1980).*
Chinese Office Action for ON 201880076166.8; dated Aug. 18, 2021; 11 pages.
Japanese Office Action for JP 2020-527868; dated ; 6 pages.
Lou Jin-fen et al; Research Progress on Synthesis of ASA and Its Alloys; Nov. 2015; 3 pages.
Zvonimir Jankovic; Macromol. Symp. 100, 89-93 (1995); "Copolymerization and Copolymers of Brominated Phenylmaleimides with Some Vinyl Monomers"; 5 pages.
Extended European Search Report for EP 18887076.0; dated Dec. 15, 2020; 7 pages.

* cited by examiner

*Primary Examiner* — Mark S Kaucher
(74) *Attorney, Agent, or Firm* — Morgan, Lewis & Bockius LLP

(57) ABSTRACT

Provided is a thermoplastic resin composition which comprises: a first copolymer comprising an alkyl acrylate-based rubber polymer, aromatic vinyl-based units, and vinyl cyan-based units; a second copolymer comprising an alkyl acrylate-based rubber polymer, aromatic vinyl-based units, and vinyl cyan-based units; a third copolymer comprising aromatic vinyl-based units and vinyl cyan-based units; a fourth copolymer comprising aromatic vinyl-based units and vinyl cyan-based units; and a fifth copolymer comprising maleimide-based units, aromatic vinyl-based units, and vinyl cyan-based units, wherein the first and second copolymers comprise alkyl acrylate-based rubber polymers with mutually different average particle sizes, and the third and fourth copolymers have mutually different weight average molecular weights.

10 Claims, No Drawings

THERMOPLASTIC RESIN COMPOSITION

CROSS-REFERENCE TO RELATED APPLICATION

This application claims priority to and the benefit of Korean Patent Application No. 10-2017-0165310, filed on Dec. 4, 2017, and Korean Patent Application No. 10-2018-0149687, filed on Nov. 28, 2018, the disclosures of which are incorporated herein by reference in their entirety.

TECHNICAL FIELD

The present invention relates to a thermoplastic resin composition, and more particularly, to a thermoplastic resin composition excellent in all of impact resistance, injection surface characteristics, metal depositability, and metal adhesion.

BACKGROUND ART

An acrylonitrile-butadiene-styrene (ABS) resin has been used for a wide range of applications including all types of building materials, interior and exterior materials of vehicles such as automobiles and motorcycles, electrical and electronic products, and the like due to its excellent processability, impact resistance, and chemical resistance.

When the ABS resin is used for exterior materials of automobiles, particularly, a rear lamp housing (tail light or rear combination lamp), a rear garnish, and the like, coating and aluminum deposition processes are performed, and the coating process before deposition causes problems of environmental pollution and a cost increase.

Accordingly, to increase the efficiency of subsequent processes and reduce environmental pollution, the use of a coating-free deposition process in which the coating process conventionally performed is omitted, and aluminum is deposited directly on an injection molded article is increasing.

When a product is prepared through the coating-free deposition process as described above, a deposited surface should exhibit excellent light reflectance after aluminum deposition, and a material should not be deformed by heat generated during the use of the product.

However, in the case of a rear lamp housing formed by including the ABS resin, a double bond of butadiene rubber used for impact reinforcement in the resin is broken by oxygen, ozone, light, or the like in air, and thus discoloration and degradation of properties are caused.

Accordingly, a method in which an acrylate-styrene-acrylonitrile (ASA) resin prepared by graft copolymerization of a butyl acrylate rubber polymer, instead of an unstable butadiene rubber polymer, with styrene and acrylonitrile is used instead of the ABS resin has been proposed. However, although the ASA resin exhibits excellent weather resistance compared to the ABS resin, appearance characteristics thereof are poor.

In order to improve the disadvantage of the ASA resin, a method in which polymethyl methacrylate (PMMA) and polycarbonate (PC), which exhibit excellent appearance characteristics, are blended and then used has been proposed. However, when PMMA and PC are blended, fluidity of a resin composition is degraded, resulting in a problem of degradation of processability, moldability, and the like.

Meanwhile, the material to be applied to the exterior of automobiles and motorcycles needs to have a beautiful appearance after molding, excellent mechanical properties (particularly, impact strength and rigidity at room temperature and low temperature), and excellent weather resistance which is stability relative to light (particularly, ultraviolet rays) to meet the purpose. Also, the material needs to exhibit excellent moldability so as to act as an exterior material. In particular, a lamp housing among exterior materials of automobiles needs to exhibit excellent impact resistance and molding processability.

In general, the ABS resin is a terpolymer of butadiene, styrene, and acrylonitrile and has excellent impact resistance and rigidity at the same time. Therefore, the ABS resin exhibits excellent mechanical properties, moldability, and colorability, and thus has been used for a wide range of applications including all types of electrical and electronic housing materials, interior materials of automobiles, and lamp housing materials. However, there is a difference in mechanical properties according to the composition of raw materials and the preparation method, and the ABS resin is vulnerable to oxygen, ozone, and heat or light (ultraviolet rays) in air because it fundamentally includes a rubber component with an unsaturated bond. For this reason, the applicability of the ABS resin to an exterior material is deteriorated, and coating is required for application to an exterior material. For example, in order to apply the ABS resin to an exterior material, particularly, a lamp housing, the surface of an injection molded ABS resin is primarily coated (base coating), aluminum is deposited thereon, and then the resultant surface is secondarily coated (top coating) to protect the aluminum film. The coating may cause problems of not only defective coating, environmental damage caused by using an excessive amount of a solvent, and avoidance by operators due to toxicity and scattering of a solvent, but also a decrease in productivity and an increase in cost due to the occurrence of an additional process.

Accordingly, research is being conducted on direct deposition without a coating procedure, and a method of adjusting the content of rubber using bimodal or other types of rubber components and a method of enhancing coatability and coating spreadability using a surfactant and the like have been proposed to increase depositability. However, since the above methods use the ABS resin including a rubber component with an unsaturated bond as a base resin, they have not solved the fundamental problem of weak weather resistance caused by the rubber component with an unsaturated bond, that is, a problem in which the surface is yellowed and cracked when exposed to heat or light in the outside for a long period of time, and impact strength is significantly degraded.

Meanwhile, the ASA resin is a material that exhibits a significant improvement in weather resistance which is a major drawback while exhibiting the excellent mechanical properties and molding processability of the ABS resin by using an acrylate-based rubber component not having an unsaturated bond instead of butadiene rubber which is a rubber component with an unsaturated bond, and has been mainly used for outdoor application using coatings or metal materials. The ASA resin exhibits excellent weather resistance even without being subjected to subsequent processes such as coating and the like, so that discoloration does not easily occur, and mechanical properties are relatively slightly degraded even when exposed to light for a long period of time.

However, the acrylate-based rubber polymer not having an unsaturated bond has an insignificant impact strength reinforcement effect compared to the butadiene-based rubber polymer and also has a low impact strength reinforcement effect at low temperature. In addition, there is a problem in which glossiness is lower than that of the ABS resin.

Therefore, there is a need to develop a resin which has excellent weather resistance, depositability, surface characteristics, and glossiness while having the excellent mechanical properties and molding processability of the ABS resin, and is able to be easily applied to an exterior material.

DISCLOSURE

Technical Problem

The present invention is directed to providing a thermoplastic resin composition capable of imparting excellent surface characteristics and metal depositability to a molded article, and also imparting excellent metal adhesion even when a metal-deposited molded article is heat-fused.

Technical Solution

According to an embodiment of the present invention, there is provided a thermoplastic resin composition which comprises: a first copolymer comprising an alkyl acrylate-based rubber polymer, aromatic vinyl-based units, and vinyl cyan-based units; a second copolymer comprising an alkyl acrylate-based rubber polymer, aromatic vinyl-based units, and vinyl cyan-based units; a third copolymer comprising aromatic vinyl-based units and vinyl cyan-based units; a fourth copolymer comprising aromatic vinyl-based units and vinyl cyan-based units; and a fifth copolymer comprising maleimide-based units, aromatic vinyl-based units, and vinyl cyan-based units, wherein the first and second copolymers comprise alkyl acrylate-based rubber polymers with mutually different average particle sizes, and the third and fourth copolymers have mutually different weight average molecular weights.

Advantageous Effects

A thermoplastic resin composition according to the present invention can impart excellent surface characteristics and metal depositability to a molded article, and can also impart excellent metal adhesion even when a metal-deposited molded article is heat-fused.

MODE FOR INVENTION

Hereinafter, the present invention will be described in more detail.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

In the present invention, the average particle sizes of an alkyl acrylate-based rubber polymer and a graft copolymer may be measured by dynamic light scattering, and specifically, may be measured using a scattering analyzer (Nicomp 380 HPL manufactured by PSS Nicomp).

In the specification, an average particle size may refer to an arithmetic average particle size in the particle size distribution as measured by dynamic light scattering, particularly, an average particle size in a scattering intensity distribution.

In the present invention, a weight average molecular weight may be measured as a relative value with respect to standard polystyrene (PS) using tetrahydrofuran (THF) as an elution solvent through gel permeation chromatography (GPC; Waters Breeze).

In the present invention, the weight average molecular weight of a shell of a first or second copolymer may be measured as a relative value with respect to standard polystyrene (PS) through GPC (Waters Breeze) after a first or second copolymer is dissolved in acetone and centrifuged, and the portion (sol) dissolved in acetone is then dissolved in THF.

In the present invention, a glass transition temperature may be measured in accordance with ASTM D3418.

In the present invention, an alkyl acrylate-based rubber polymer may be prepared by polymerizing, specifically, cross-linking an alkyl acrylate-based monomer to prepare a seed, and polymerizing, specifically, cross-linking an alkyl acrylate monomer in the presence of the seed. The alkyl acrylate monomer may be a $C_1$ to $C_{10}$ alkyl acrylate, and the $C_1$ to $C_{10}$ alkyl acrylate may be one or more selected from the group consisting of methyl acrylate, ethyl acrylate, butyl acrylate, and ethylhexyl acrylate, and, among these compounds, butyl acrylate is preferred.

In the present invention, the aromatic vinyl-based units may be units derived from an aromatic vinyl-based monomer, and the aromatic vinyl-based monomer may be one or more selected from the group consisting of styrene, α-methylstyrene, α-ethylstyrene, and p-methylstyrene, and, among these compounds, styrene is preferred.

In the present invention, the vinyl cyan-based units may be units derived from a vinyl cyan-based monomer, and the vinyl cyan-based monomer may be one or more selected from the group consisting of acrylonitrile, methacrylonitrile, phenylacrylonitrile, and α-chloroacrylonitrile, and among these compounds, acrylonitrile is preferred.

In the present invention, the maleimide-based unit may be derived from a maleimide-based monomer, and the maleimide-based monomer may be one or more selected from the group consisting of maleimide, N-methylmaleimide, N-ethylmaleimide, N-propylmaleimide, N-isopropylmaleimide, N-butylmaleimide, N-isobutylmaleimide, N-t-butylmaleimide, N-laurylmaleimide, N-cyclohexylmaleimide, N-phenylmaleimide, N-(4-chlorophenyl)maleimide, 2-methyl-N-phenylmaleimide, N-(4-bromophenyl)maleimide, N-(4-nitrophenyl)maleimide, N-(4-hydroxyphenyl)maleimide, N-(4-methoxyphenyl)maleimide, N-(4-carboxyphenyl)maleimide, and N-benzylmaleimide, and, among these compounds, N-phenylmaleimide is preferred.

A thermoplastic resin composition according to an embodiment of the present invention comprises 1) a first copolymer comprising an alkyl acrylate-based rubber polymer, aromatic vinyl-based units, and vinyl cyan-based units; 2) a second copolymer comprising an alkyl acrylate-based rubber polymer, aromatic vinyl-based units, and vinyl cyan-based units; 3) a third copolymer comprising aromatic vinyl-based units and vinyl cyan-based units; 4) a fourth copolymer comprising aromatic vinyl-based units and vinyl cyan-based units; and 5) a fifth copolymer comprising maleimide-based units, aromatic vinyl-based units, and vinyl cyan-based units, wherein the first and second copolymers comprise alkyl acrylate-based rubber polymers with mutually different average particle sizes, and the third and fourth copolymers have mutually different weight average molecular weights.

The thermoplastic resin composition according to an embodiment of the present invention includes the first and second copolymers including alkyl acrylate-based rubber polymers with mutually different average particle sizes, and thus may be excellent in all of weather resistance, impact resistance, surface characteristics, metal depositability, and metal adhesion. When the thermoplastic resin composition includes only one type of a graft copolymer with the same average particle size, a thermoplastic resin composition excellent in all of impact resistance, surface characteristics, metal depositability, and metal adhesion may not be realized. Specifically, when the thermoplastic resin composition does not include the first copolymer including an alkyl acrylate-based rubber polymer, impact resistance may be significantly degraded. Also, when the thermoplastic resin composition does not include the second copolymer including an alkyl acrylate-based rubber polymer with a small average particle size, surface characteristics, metal depositability, and metal adhesion may be significantly degraded.

The thermoplastic resin composition according to an embodiment of the present invention includes the third and fourth copolymers with mutually different weight average molecular weights, and thus may be excellent in all of injection surface characteristics, metal depositability, and metal adhesion. When the thermoplastic resin composition includes only a matrix copolymer with the same weight average molecular weight, a thermoplastic resin composition excellent in all of injection surface characteristics, metal depositability, and metal adhesion may not be realized. Specifically, when the thermoplastic resin composition does not include the third copolymer with a relatively low weight average molecular weight, surface characteristics and metal depositability may be significantly degraded. Also, when the thermoplastic resin composition does not include the fourth copolymer with a high weight average molecular weight, surface characteristics, metal depositability, and metal adhesion may be significantly degraded.

Hereinafter, each component of the thermoplastic resin composition according to an embodiment of the present invention will be described in detail.

1. First Copolymer

The first copolymer includes an alkyl acrylate-based rubber polymer, aromatic vinyl-based units, and vinyl cyan-based units.

The first copolymer may impart excellent surface characteristics and metal depositability to a molded article formed of the thermoplastic resin composition, and may also impart excellent metal adhesion even when a metal-deposited molded article is heat-fused.

The first copolymer may be prepared by graft polymerization of the alkyl acrylate-based rubber polymer with the aromatic vinyl-based monomer and the vinyl cyan-based monomer.

The alkyl acrylate-based rubber polymer may have an average particle size of 0.05 to 0.18 μm, 0.08 to 0.18 μm, or 0.1 to 0.15 μm, and preferably has an average particle size of 0.1 to 0.15 μm. When the average particle size of the alkyl acrylate-based rubber polymer falls within the above range, more excellent surface characteristics and metal depositability may be imparted to a molded article formed of the thermoplastic resin composition. Also, when a metal-deposited molded article is heat-fused, more excellent metal adhesion may be imparted. When the average particle size of the alkyl acrylate-based rubber polymer is less than the above range, impact resistance of the thermoplastic resin composition may be significantly degraded. Also, when the average particle size of the alkyl acrylate-based rubber polymer is greater than the above range, surface characteristics of a molded article formed of the thermoplastic resin composition are degraded, and thus metal depositability is degraded. In addition, when a metal-deposited molded article is heat-fused, line marks, bubble marks, and the like occur at the surface thereof, and thus the resin composition may not be applied to a rear lamp housing for automobiles.

The alkyl acrylate-based rubber polymer may be included in an amount of 35 to 60 wt %, 40 to 55 wt %, or 45 to 50 wt % with respect to the total weight of the first copolymer, and is preferably included in an amount of 45 to 50 wt %. When the content of the alkyl acrylate-based rubber polymer falls within the above range, more excellent impact resistance, surface characteristics, and metal depositability may be imparted to a molded article formed of the thermoplastic resin composition. In addition, when a metal-deposited molded article is heat-fused, more excellent metal adhesion may be imparted.

The aromatic vinyl-based unit may be included in an amount of 25 to 45 wt %, 30 to 45 wt %, or 35 to 40 wt % with respect to the total weight of the first copolymer, and is preferably included in an amount of 35 to 40 wt %. When the content of the aromatic vinyl-based unit falls within the above range, processability of the thermoplastic resin composition is further improved, and surface characteristics of a molded article formed of the thermoplastic resin composition may be further improved.

The vinyl cyan-based unit may be included in an amount of 5 to 25 wt %, 5 to 20 wt %, or 10 to 15 wt % with respect to the total weight of the first copolymer, and is preferably included in an amount of 10 to 15 wt %. When the content of the vinyl cyan-based unit falls within the above range, mechanical properties and chemical resistance of the thermoplastic resin composition may be further improved.

A shell of the first copolymer may have a weight average molecular weight of 90,000 to 180,000 g/mol, 100,000 to 170,000 g/mol, or 110,000 to 150,000 g/mol, and preferably has a weight average molecular weight of 110,000 to 150,000 g/mol. When the weight average molecular weight of a shell of the first copolymer falls within the above range, fluidity of the thermoplastic resin composition may be further improved.

The first copolymer may be prepared by graft polymerization of the alkyl acrylate-based rubber polymer, the aromatic vinyl-based monomer, and the vinyl cyan-based monomer through one or more methods selected from the group consisting of bulk polymerization, emulsion polymerization, and suspension polymerization, and, among these methods, emulsion polymerization is preferably used.

The first copolymer may be included in an amount of 10 to 35 wt %, 15 to 30 wt %, or 20 to 25 wt % with respect to the total weight of the thermoplastic resin composition, and is preferably included in an amount of 20 to 25 wt %. When the content of the first copolymer falls within the above range, more excellent impact resistance and surface characteristics may be imparted to a molded article formed of the thermoplastic resin composition. Also, when a metal-deposited molded article is heat-fused, more excellent metal adhesion may be imparted.

2. Second Copolymer

The second copolymer includes an alkyl acrylate-based rubber polymer, aromatic vinyl-based units, and vinyl cyan-based units.

The second copolymer may impart excellent impact resistance to a molded article formed of the thermoplastic resin composition.

The second copolymer may be prepared by graft polymerization of the alkyl acrylate-based rubber polymer with the aromatic vinyl-based monomer and the vinyl cyan-based monomer.

The alkyl acrylate-based rubber polymer may have an average particle size of 0.2 to 1.0 μm, 0.2 to 0.7 μm, or 0.22 to 0.5 μm, and preferably has an average particle size of 0.22 to 0.5 μm. When the average particle size of the alkyl acrylate-based rubber polymer falls within the above range, more excellent impact resistance may be imparted to the thermoplastic resin composition. When the average particle size of the alkyl acrylate-based rubber polymer is less than the above range, impact resistance of the thermoplastic resin composition is significantly degraded. Also, when the average particle size of the alkyl acrylate-based rubber polymer is greater than the above range, surface characteristics of a molded article formed of the thermoplastic resin composition are significantly degraded.

The alkyl acrylate-based rubber polymer may be included in an amount of 35 to 60 wt %, 40 to 55 wt %, or 45 to 50 wt % with respect to the total weight of the second copolymer, and is preferably included in an amount of 45 to 50 wt %. When the content of the alkyl acrylate-based rubber polymer falls within the above range, more excellent impact resistance may be imparted to a molded article formed of the thermoplastic resin composition.

The aromatic vinyl-based unit may be included in an amount of 25 to 45 wt %, 30 to 45 wt %, or 35 to 40 wt % with respect to the total weight of the second copolymer, and is preferably included in an amount of 35 to 40 wt %. When the content of the aromatic vinyl-based unit falls within the above range, processability of the thermoplastic resin composition is further improved, and surface characteristics of a molded article formed of the thermoplastic resin composition may be further improved.

The vinyl cyan-based unit may be included in an amount of 5 to 25 wt %, 5 to 20 wt %, or 10 to 15 wt % with respect to the total weight of the second copolymer, and is preferably included in an amount of 10 to 15 wt %. When the content of the vinyl cyan-based unit falls within the above range, chemical resistance of the thermoplastic resin composition may be further improved.

A shell of the second copolymer may have a weight average molecular weight of 110,000 to 170,000 g/mol, 120,000 to 160,000 g/mol, or 130,000 to 150,000 g/mol, and preferably has a weight average molecular weight of 130,000 to 150,000 g/mol. When the weight average molecular weight of a shell in the second copolymer falls within the above range, fluidity and impact resistance of the thermoplastic resin composition may be further improved.

The second copolymer may be prepared by graft polymerization of the alkyl acrylate-based rubber polymer, the aromatic vinyl-based monomer, and the vinyl cyan-based monomer through one or more methods selected from the group consisting of bulk polymerization, emulsion polymerization, and suspension polymerization, and, among these methods, emulsion polymerization is preferably used.

The second copolymer may be included in an amount of 1 to 25 wt %, 5 to 20 wt %, or 10 to 15 wt % with respect to the total weight of the thermoplastic resin composition, and is preferably included in an amount of 10 to 15 wt %. When the content of the second copolymer falls within the above range, more excellent impact resistance may be imparted to a molded article formed of the thermoplastic resin composition.

3. Third Copolymer

The third copolymer includes aromatic vinyl-based units and vinyl cyan-based units.

The third copolymer may harmoniously impart properties, that is, heat resistance, impact resistance, and fluidity to the thermoplastic resin composition.

A difference between the weight average molecular weights of the third copolymer and the fourth copolymer may be 100,000 to 200,000 g/mol, preferably, 120,000 to 180,000 g/mol. When the difference between the weight average molecular weights of the third copolymer and the fourth copolymer falls within the above range, a thermoplastic resin composition excellent in all of injection surface characteristics, metal depositability, and metal adhesion may be produced. When the difference between the weight average molecular weights thereof is less than the above range, cracking and the like may occur due to low impact strength. Also, when the difference between the weight average molecular weights thereof is greater than the above range, injection processability may be degraded due to low fluidity.

The third copolymer may have a weight average molecular weight of 100,000 to 200,000 g/mol, 110,000 to 180,000 g/mol, or 120,000 to 160,000 g/mol, and preferably has a weight average molecular weight of 120,000 to 160,000 g/mol. When the weight average molecular weight of the third copolymer falls within the above range, mechanical properties, fluidity, and heat resistance may be better achieved. When the weight average molecular weight of the third copolymer is less than the above range, impact resistance may be significantly degraded. When the weight average molecular weight of the third copolymer is greater than the above range, it may be difficult to harmoniously achieve mechanical properties, fluidity, and heat resistance.

The third copolymer may include the aromatic vinyl-based unit and the vinyl cyan-based unit in a weight ratio of 85:15 to 60:40, 80:20 to 65:35, or 75:25 to 70:30, and preferably, in a weight ratio of 75:25 to 70:30. When the weight ratio of the aromatic vinyl-based unit and the vinyl cyan-based unit falls within the above range, mechanical properties, fluidity, and heat resistance may be better achieved.

The third copolymer may be prepared by polymerization of the aromatic vinyl-based monomer and the vinyl cyan-based monomer through one or more methods selected from the group consisting of bulk polymerization, emulsion polymerization, and suspension polymerization, and, among these methods, bulk polymerization is preferably used.

The third copolymer may be included in an amount of 10 to 35 wt %, 15 to 30 wt %, or 20 to 25 wt % with respect to the total weight of the thermoplastic resin composition, and is preferably included in an amount of 20 to 25 wt %. When the content of the third copolymer falls within the above range, mechanical properties, fluidity, and heat resistance of the thermoplastic resin composition may be harmoniously achieved.

4. Fourth Copolymer

The fourth copolymer includes aromatic vinyl-based units and vinyl cyan-based units.

The fourth copolymer may harmoniously impart properties, that is, heat resistance, impact resistance, and fluidity to the thermoplastic resin composition.

The fourth copolymer may have a weight average molecular weight of 210,000 to 300,000 g/mol, 210,000 to 290,000 g/mol, or 220,000 to 280,000 g/mol, and preferably has a weight average molecular weight of 220,000 to 280,000 g/mol. When the weight average molecular weight of the fourth copolymer falls within the above range, when a molded article is heat-fused, few line marks occur, and bubble marks and the like are not formed. Accordingly, the resin composition may be more appropriate for a rear lamp housing for automobiles. When the weight average molecular weight of the fourth copolymer is less than the above range, when a metal-deposited molded article is heat-fused, a large number of line marks, bubble marks, and the like may occur, and thus the resin composition may not be appropriate for a rear lamp housing for automobiles. When the weight average molecular weight of the fourth copolymer is greater than the above range, fluidity is too lowered, and thus processability may be degraded.

The fourth copolymer may include the aromatic vinyl-based unit and the vinyl cyan-based unit in a weight ratio of 85:15 to 60:40, 80:20 to 65:35, or 75:25 to 70:30, and preferably in a weight ratio of 75:25 to 70:30. When the weight ratio of the aromatic vinyl-based unit and the vinyl cyan-based unit falls within the above range, there are advantages of excellent impact resistance and excellent processability.

The fourth copolymer may be prepared by polymerization of the aromatic vinyl-based monomer and the vinyl cyan-based monomer through one or more methods selected from the group consisting of bulk polymerization, emulsion polymerization, and suspension polymerization, and, among these methods, suspension polymerization is preferably used.

The fourth copolymer may be included in an amount of 5 to 30 wt %, 10 to 25 wt %, or 15 to 20 wt % with respect to the total weight of the thermoplastic resin composition, and is preferably included in an amount of 15 to 20 wt %. When the content of the fourth copolymer falls within the above range, when a metal-deposited molded article is heat-fused, line marks, bubble marks, and the like are not formed. Accordingly, the resin composition may be more appropriate for a rear lamp housing for automobiles.

5. Fifth Copolymer

The fifth copolymer includes maleimide-based units, aromatic vinyl-based units, and vinyl cyan-based units.

The fifth copolymer may impart heat resistance to the thermoplastic resin composition.

The fifth copolymer may have a glass transition temperature of 150 to 190° C., 160 to 185° C., or 170 to 180° C., and preferably has a glass transition temperature of 170 to 180° C. When the glass transition temperature of the fifth copolymer falls within the above range, more excellent heat resistance may be imparted to the thermoplastic resin composition.

The maleimide-based unit may be included in an amount of 25 to 50 wt %, 30 to 45 wt %, or 35 to 40 wt % with respect to the total weight of the fifth copolymer, and is preferably included in an amount of 35 to 40 wt %. When the content of the maleimide-based unit falls within the above range, heat resistance of the fifth copolymer may be further improved.

The aromatic vinyl-based unit may be included in an amount of 45 to 70 wt %, 50 to 65 wt %, or 55 to 60 wt % with respect to the total weight of the fifth copolymer, and is preferably included in an amount of 55 to 60 wt %. When the content of the aromatic vinyl-based unit falls within the above range, processability and appearance characteristics of the fifth copolymer may be improved.

The vinyl cyan-based unit may be included in an amount of 0.1 to 20 wt %, 1 to 15 wt %, or 5 to 10 wt % with respect to the total weight of the fifth copolymer, and is preferably included in an amount of 5 to 10 wt %. When the content of the vinyl cyan-based unit falls within the above range, compatibility between the maleimide-based unit and the aromatic vinyl-based unit may be improved.

The fifth copolymer may be included in an amount of 15 to 40 wt %, 20 to 35 wt %, or 25 to 30 wt % with respect to the total weight of the thermoplastic resin composition, and is preferably included in an amount of 25 to 30 wt %. When the content of the fifth copolymer falls within the above range, heat resistance of the thermoplastic resin composition may be further improved.

In addition, there is provided a molded article which is formed of the thermoplastic resin composition according to an embodiment of the present invention, has a diffuse reflectance of 2.5% or less and an impact strength (¼ inch) of 7 kg-cm/cm or more, as measured in accordance with ASTM D256, and does not have line marks formed when being heat-fused. When the properties of the molded article meet the above conditions, a molded article with excellent metal depositability, metal adhesion, and impact resistance may be provided.

Hereinafter, the present invention will be described in detail with reference to embodiments so that those skilled in the art can easily carry out the present invention. However, the present invention may be realized in several different forms, and therefore, is not limited to embodiments described herein.

Preparation Example 1: Preparation of First Copolymer 50 parts by weight of a butyl acrylate rubber polymer having an average particle size of 0.12 μm, 36.5 parts by weight of styrene, and 13.5 parts by weight of acrylonitrile were graft-polymerized through emulsion polymerization to prepare a graft copolymer. In this case, a shell of the obtained graft copolymer had a weight average molecular weight of 120,000 g/mol.

Preparation Example 2: Preparation of Second Copolymer 50 parts by weight of a butyl acrylate rubber polymer having an average particle size of 0.22 μm, 36.5 parts by weight of styrene, and 13.5 parts by weight of acrylonitrile were graft-polymerized through emulsion polymerization to prepare a graft copolymer. In this case, a shell of the obtained graft copolymer had a weight average molecular weight of 140,000 g/mol.

Preparation Example 3: Preparation of Third Copolymer 73 parts by weight of styrene, 27 parts by weight of acrylonitrile, 0.1 part by weight of t-butyl peroxide as an initiator, 0.05 part by weight of t-dodecyl mercaptan as a molecular weight controlling agent, and 20 parts by weight of toluene as a reaction solvent were continuously added to a reactor set to 145° C. at a predetermined rate for 2 hours, and bulk polymerization was performed to prepare a polymerization product. The obtained polymerization product was transferred to a devolatilizer, an unreacted monomer and a solvent were recovered and removed, and the resultant substance was put into a twin screw extruder to prepare a pellet type copolymer. In this case, the copolymer had a weight average molecular weight of 125,000 g/mol.

Preparation Example 4: Preparation of Fourth Copolymer 73 parts by weight of styrene, 27 parts by weight of acrylonitrile, 100 parts by weight of ion exchanged water, 0.1 part by weight of 1,1'-azobis(cyclohexane-1-carbonitrile) as an initiator, 2 parts by weight of tricalcium phosphate as a suspending agent, and 0.3 part by weight of t-dodecyl mercaptan as a molecular weight controlling agent were put into a reactor. The temperature inside the reactor was raised to 92° C., and polymerization was then performed for 360 minutes and terminated. Subsequently, formic acid was added to the reactor in such a way that the pH of a polymerization solution was 2.5, and washing, dehydration, and drying processes were then performed to prepare a copolymer. In this case, the copolymer had a weight average molecular weight of 270,000 g/mol.

EXAMPLES AND COMPARATIVE EXAMPLES

The specifications of components used in Examples and Comparative Examples below are as follows.

1) First copolymer: The graft copolymer according to Preparation Example 1 was used.

2) Second copolymer: The graft copolymer according to Preparation Example 2 was used.

3) Third copolymer: The copolymer according to Preparation Example 3 was used.

4) Fourth copolymer: The copolymer according to Preparation Example 4 was used.

5) Fifth copolymer: PAS 1460 manufactured by NIPPON SHOKUBAI Co., Ltd. (an N-phenylmaleimide/styrene/acrylonitrile copolymer with a glass transition temperature of 167° C.) was used.

The above-described components were mixed in contents as listed in Table 1 below and stirred to prepare a thermoplastic resin composition.

Experimental Example 1

Each of the thermoplastic resin compositions according to Examples and Comparative Examples was injected to prepare a specimen, and properties of the specimen were evaluated by methods as described below. Results thereof are shown in Table 1 below.

1) Impact strength (kg-cm/cm, ¼ inch): measured in accordance with ASTM D256

2) HDT (° C.): measured under conditions of ¼ inch, 18.6 kgf, and 120° C./hr in accordance with ASTM D648-7

Experimental Example 2

Aluminum (Al) was vacuum-deposited on the surface of the specimen prepared into a size of 10×10 cm by injecting each of the thermoplastic resin compositions according to Examples and Comparative Examples using vacuum deposition equipment (trade name: DSC-500A manufactured by Daehan Vacuum Engineering Co.). Properties of the specimen on which an Al film was formed were measured by methods as described below, and results thereof are shown in Table 1 below.

3) Diffuse reflectance (%): measured using a surface reflectometer (trade name: TR1100A manufactured by Tokyo Denshoku Co., Ltd)

4) Heat fusibility at room temperature: After the specimen on which an Al film was formed was stored at room temperature for 24 hours, a contact heat fusion test was performed on a hot plate set to 240° C. for 20 seconds, and the fused surface was observed through visual observation.

5) Heat fusibility under wet condition: After the specimen on which an Al film was formed was stored at 50° C. and a relative humidity of 95%, a contact heat fusion test was performed on a hot plate set to 240° C. for 20 seconds, and the fused surface was observed through visual observation.

⊚: no occurrence of lines and bubbles

○: no occurrence of lines and occurrence of slight number of bubbles

Δ: occurrence of short lines and occurrence of slight number of bubbles x: occurrence of long lines and occurrence of large number of bubbles

TABLE 1

| | Examples | | | | Comparative Examples | | | | | |
|---|---|---|---|---|---|---|---|---|---|---|
| Classification | 1 | 2 | 3 | 4 | 1 | 2 | 3 | 4 | 5 | 6 |
| 1) First copolymer | 25 | 20 | 25 | 25 | — | 35 | 25 | 25 | 36 | 42 |
| 2) Second copolymer | 10 | 15 | 10 | 10 | 35 | — | 10 | 10 | 14 | 18 |
| 3) Third copolymer | 20 | 20 | 25 | 20 | 20 | 20 | — | 35 | 29 | 36 |
| 4) Fourth copolymer | 15 | 15 | 15 | 20 | 15 | 15 | 35 | — | 21 | — |
| 5) Fifth copolymer | 30 | 30 | 25 | 25 | 30 | 30 | 30 | 30 | — | — |
| Impact strength | 7 | 8 | 9 | 9 | 10 | 3 | 9 | 7 | 13 | 18 |
| HDT | 103 | 103 | 101 | 101 | 103 | 103 | 103 | 102 | 85 | 84 |
| Diffuse reflectance | 2.2 | 2.5 | 1.8 | 2.4 | 4.5 | 1.6 | 5.2 | 2.0 | 3.5 | 3.3 |
| Heat fusibility at room temperature | ⊚ | ○ | ⊚ | ○ | Δ | ○ | ⊚ | X | ⊚ | X |

TABLE 1-continued

| Classification | Examples | | | | Comparative Examples | | | | | |
|---|---|---|---|---|---|---|---|---|---|---|
| | 1 | 2 | 3 | 4 | 1 | 2 | 3 | 4 | 5 | 6 |
| Heat fusibility under wet condition | ○ | ○ | ○ | ○ | Δ | ○ | ○ | X | ○ | X |

Referring to Table 1, it can be confirmed that Examples 1 to 4 exhibited an impact strength of 7 kg-cm/cm or more which indicated excellent impact resistance, an HDT of 101° C. or more which indicated excellent heat resistance, a diffuse reflectance of 2.5% or less which indicated excellent injection surface characteristics and aluminum depositability, and no occurrence of lines and bubbles in the evaluation of heat fusibility which indicated excellent aluminum adhesion. It can be confirmed that Example 5 exhibited degraded heat resistance due to a small amount of the fifth copolymer included therein and degraded heat fusibility due to an excessive amount of the third copolymer included therein. It can be confirmed that Example 6 exhibited a diffuse reflectance of 5% because a small amount of the third copolymer and an excessive amount of the fourth copolymer were included, indicating that injection surface characteristics were poor, and thus aluminum depositability was degraded.

It can be confirmed through results of Examples 1 to 6 that, when components of the thermoplastic resin composition according to the present invention are mixed at an optimal ratio, all of impact resistance, heat resistance, aluminum depositability, and aluminum adhesion were excellent.

Meanwhile, it can be confirmed that Comparative Example 1, in which a first copolymer was not included, exhibited degraded injection surface characteristics, and thus aluminum depositability was degraded, and heat fusibility was also degraded. It can be confirmed that Comparative Example 2, in which a second copolymer was not included, exhibited significantly degraded impact strength. It can be confirmed that Comparative Example 3, in which a third copolymer was not included, exhibited an increased diffuse reflectance, and thus injection surface characteristics and aluminum depositability were degraded. It can be confirmed that Comparative Example 4, in which a fourth copolymer was not included, exhibited degraded heat fusibility. It can be confirmed that Comparative Example 5, in which a fifth copolymer was not included, exhibited degraded heat resistance and an increased diffuse reflectance, and thus injection surface characteristics and aluminum depositability were degraded. It can be confirmed that Comparative Example 6, in which fourth and fifth copolymers all were not included, exhibited degraded heat resistance and an increased diffuse reflectance, and thus injection surface characteristics and aluminum depositability were degraded, and heat fusibility was also degraded.

The invention claimed is:
1. A thermoplastic resin composition comprising:
  a first copolymer comprising an alkyl acrylate-based rubber polymer, aromatic vinyl-based units, and vinyl cyan-based units;
  a second copolymer comprising an alkyl acrylate-based rubber polymer, aromatic vinyl-based units, and vinyl cyan-based units;
  a third copolymer comprising aromatic vinyl-based units and vinyl cyan-based units;
  a fourth copolymer comprising aromatic vinyl-based units and vinyl cyan-based units; and
  a fifth copolymer including maleimide-based units, aromatic vinyl-based units, and vinyl cyan-based units,
  wherein the first and second copolymers comprise particles consisting of alkyl acrylate-based rubber polymers with mutually different average particle sizes, and the third and fourth copolymers have mutually different weight average molecular weights.

2. The thermoplastic resin composition of claim 1, wherein the first copolymer comprises an alkyl acrylate-based rubber polymer having an average particle size of 0.05 to 0.18 μm.

3. The thermoplastic resin composition of claim 1, wherein the second copolymer i comprises an alkyl acrylate-based rubber polymer having an average particle size of 0.2 to 1.0 μm.

4. The thermoplastic resin composition of claim 1, wherein a difference between the weight average molecular weights of the third copolymer and the fourth copolymer is 100,000 to 200,000 g/mol.

5. The thermoplastic resin composition of claim 1, wherein the third copolymer has a weight average molecular weight of 100,000 to 200,000 g/mol.

6. The thermoplastic resin composition of claim 1, wherein the fourth copolymer has a weight average molecular weight of 210,000 to 300,000 g/mol.

7. The thermoplastic resin composition of claim 1, wherein the fifth copolymer has a glass transition temperature of 165 to 190° C.

8. The thermoplastic resin composition of claim 1, wherein the fifth copolymer is an N-phenylmaleimide/styrene/acrylonitrile copolymer.

9. The thermoplastic resin composition of claim 1, which comprises:
  the first copolymer in an amount of 10 to 35 wt %;
  the second copolymer in an amount of 1 to 25 wt %;
  the third copolymer in an amount of 10 to 35 wt %;
  the fourth copolymer in an amount of 5 to 30 wt %; and
  the fifth copolymer in an amount of 15 to 40 wt %.

10. The thermoplastic resin composition of claim 1, which comprises:
  the first copolymer in an amount of 15 to 30 wt %;
  the second copolymer in an amount of 5 to 20 wt %;
  the third copolymer in an amount of 15 to 30 wt %;
  the fourth copolymer in an amount of 10 to 25 wt %; and
  the fifth copolymer in an amount of 20 to 35 wt %.

* * * * *